United States Patent [19]

Meijer et al.

[11] Patent Number: 4,885,980

[45] Date of Patent: Dec. 12, 1989

[54] HYDRODYNAMIC BEARING

[75] Inventors: Roelf J. Meijer; Benjamin Ziph, both of Ann Arbor, Mich.

[73] Assignee: Stirling Thermal Motors, Inc., Ann Arbor, Mich.

[21] Appl. No.: 166,323

[22] Filed: Mar. 10, 1988

[51] Int. Cl.⁴ .......................... F01B 3/00; F01B 13/04
[52] U.S. Cl. ..................................... 92/12.2; 92/153; 417/269; 184/6.17; 74/60
[58] Field of Search ................ 92/12.2, 153, 154, 156, 92/157, 70, 71; 417/269; 60/650; 184/6.17; 74/60, 839

[56] References Cited

U.S. PATENT DOCUMENTS

| | | | |
|---|---|---|---|
| 2,150,162 | 3/1939 | Hall | 184/6.17 |
| 2,258,138 | 10/1941 | Hall | 74/60 |
| 2,570,698 | 10/1951 | Manseau | 74/60 |
| 2,672,095 | 3/1954 | Lucien et al. | 74/60 |
| 3,092,307 | 6/1963 | Heidorn | 92/153 |
| 3,171,509 | 3/1965 | Girodin | 74/60 |
| 3,180,159 | 4/1965 | Girodin | 74/60 |
| 3,188,973 | 6/1965 | Firth et al. | 92/157 |
| 4,688,439 | 8/1987 | Cureton et al. | 74/60 |
| 4,734,013 | 3/1988 | Valavaara | 417/271 |

FOREIGN PATENT DOCUMENTS

| | | | |
|---|---|---|---|
| 1295451 | 5/1962 | France | 184/6.17 |
| 2572774 | 5/1986 | France | 417/269 |
| 2588617 | 4/1987 | France | 417/269 |
| 0123715 | 9/1979 | Japan | 417/269 |
| 0006083 | 1/1981 | Japan | 184/6.17 |
| 18241 | of 1911 | United Kingdom | 92/157 |

Primary Examiner—Edward K. Look
Assistant Examiner—Thomas Denion
Attorney, Agent, or Firm—Harness, Dickey & Pierce

[57] ABSTRACT

A bearing arrangement particularly useful for supporting the driveshaft of a thermal engine in which the driveshaft is acted upon by a rotating bending load. Since a rotating bending load of such thermal engines generates driveshaft bending deflections which rotate with the driveshaft, the bearings supporting the driveshaft must be capable of accommodating such deflection. Conventional rolling element type bearings can accommodate driveshaft deflection or wobble but have limited operational lifespans. In accordance with this invention, a driveshaft bearing arrangement is provided utilizing plane bearings having spherical surfaces which restrain radial loads while accommodating driveshaft wobble. In one embodiment, the spherical bearing includes a ring member affixed to the driveshaft having a spherical outer surface which closely conforms to a concave bearing surface. In a second embodiment, the driveshaft passes through a ring member having a cylindrical surface interacting with a cylindrical journal surface of the driveshaft to rotatably support the driveshaft. The ring member further has a convex spherical configuration closely conforming to concave spherical surfaces of outer bearing shells which accommodate driveshaft wobble.

12 Claims, 2 Drawing Sheets

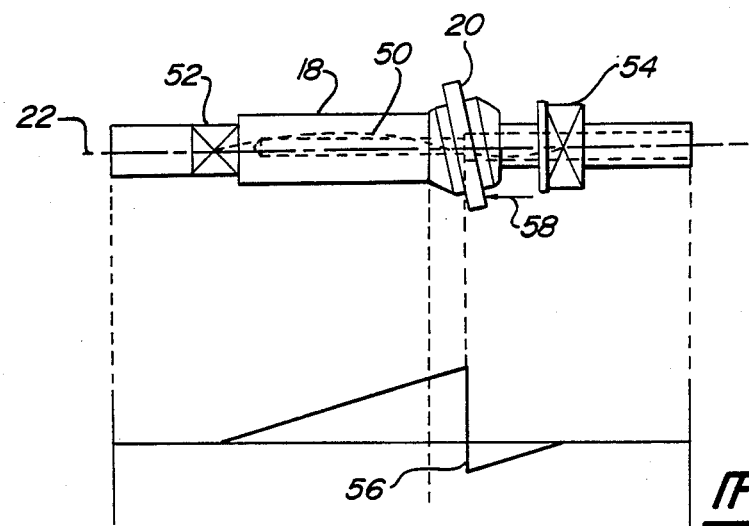
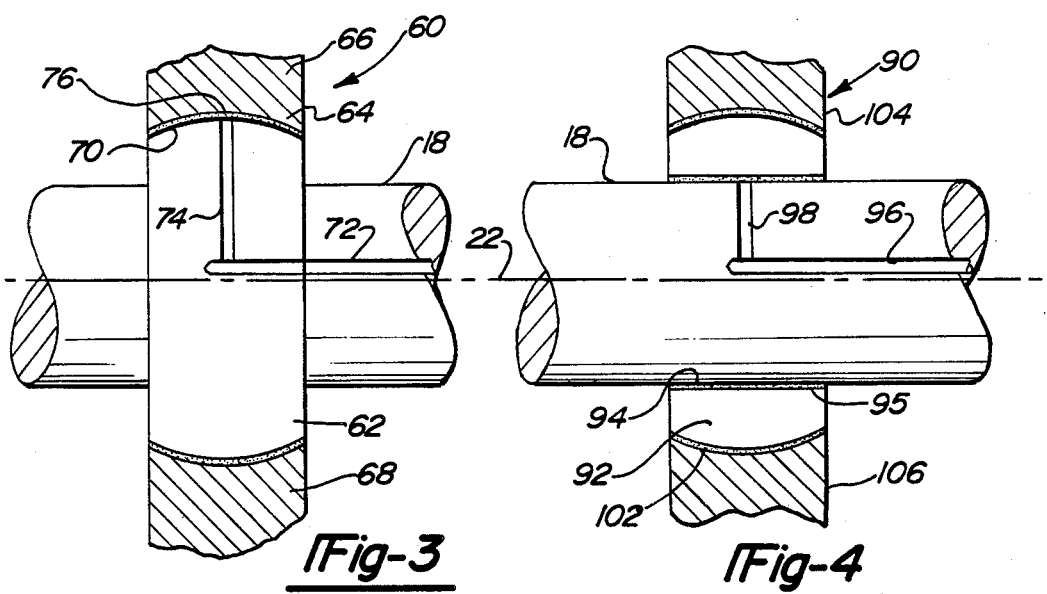
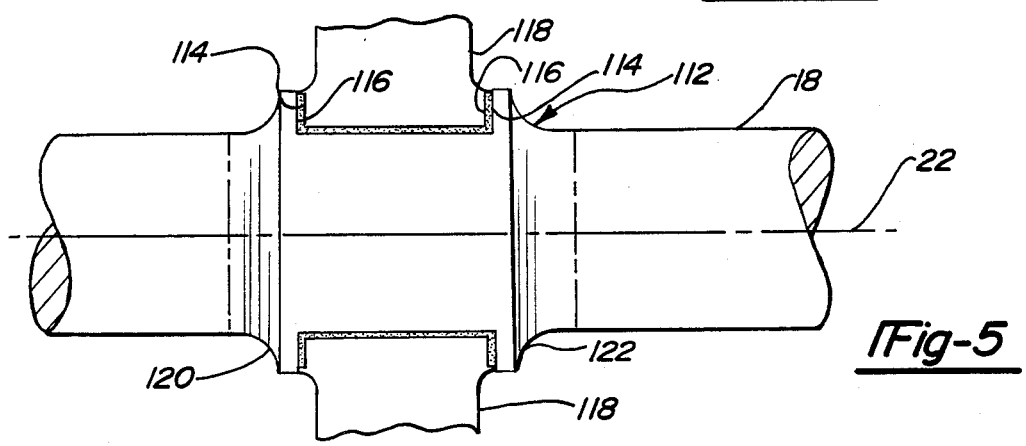

HYDRODYNAMIC BEARING

BACKGROUND AND SUMMARY OF THE INVENTION

This invention relates to a hydrodynamic bearing, and particularly to one useful as a driveshaft bearing of a thermal engine such as a Stirling cycle engine.

In one design of a Stirling engine, a swashplate is journaled for rotation within a housing. The swashplate is driven by crossheads connected to reciprocating pistons and the swashplate in turn rotates a driveshaft through which mechanical power is delivered to a load coupled to the engine. The construction of this type of drive mechanism is such that forces acting on the swashplate are radially positioned from the axis of rotation of the swashplate. The interaction of the drive mechanism with the swashplate is such that forces acting on the swashplate can be resolved into components producing rotation and components which impart a rotating bending load on the driveshaft.

The driveshaft of the above mentioned type of thermal engine is supported at displaced axial locations by bearings. The swashplate is carried by the unsupported shaft length between the bearings which is subjected to bending deflection caused by the rotating bending moment. The bearings must therefore accommodate a small degree of bending deflection of the driveshaft. Rolling element type bearings may be used which allow a predetermined range of angular displacement of the driveshaft. Although such bearings generally operate satisfactorily, they have a finite lifespan. As with any complex machine mechanism, it is desirable to minimize required maintenance and mechanical failures. Simple journal or plane hydrodynamic bearings have inherently long life capabilities. Typical plane bearings, however, do not accommodate angular displacement of a shaft journal with respect to the bearing. In view of the foregoing, there is a need to provide an improved bearing for supporting driveshafts of thermal engines, such as Stirling engines, which has the capability of accommodating rotating bending deflection of the driveshaft while providing long operational lifespan capabilities.

In accordance with the present invention, the above mentioned desirable features are obtained through the use of a plane hydrodynamic bearing forming a convex spherical surface having its center coincident with the axis of rotation of the driveshaft which is fitted within a bearing forming a complementary concave spherical surface. In accordance with a first embodiment of this invention, a spherical journal is rigidly affixed to and rotatable with the supported driveshaft. In accordance with a second embodiment of the invention, the driveshaft has a cylindrical journal which passes through a bearing member having a cylindrical inside bearing surface which supports the shaft journal, and a spherical outer surface which is closely received by a concave spherical bearing. Both embodiments accommodate slight axial "wobble" of the supported driveshaft. Lubrication of the bearing surface interfaces can be obtained through a splash-type or immersion system, or through pressurized lubrication feed.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 2 is a schematic diagram showing the bending moments acting on the driveshaft of the engine shown in FIG. 1.

FIG. 3 is a partially elevational and partially sectional view of a hydrodynamic bearing in accordance with the first embodiment of this invention.

FIG. 4 is a partially elevational and partially cross-sectional view of a hydrodynamic bearing in accordance with a second embodiment of this invention.

FIG. 5 is a cross-sectional view of a steering bearing for use with the hydrodynamic bearing shown in FIG. 4.

DETAILED DESCRIPTION OF THE INVENTION

Figure 1:
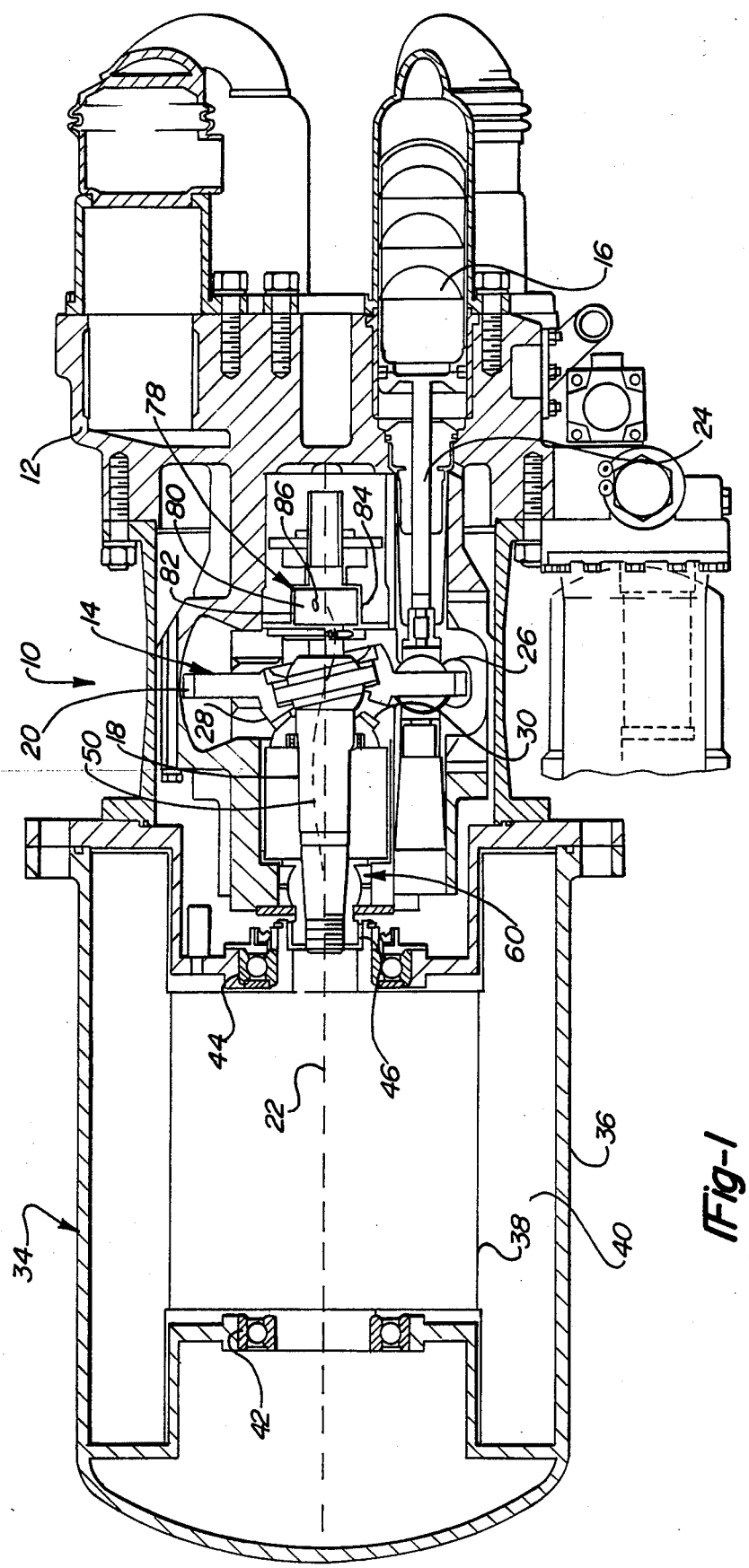
FIG. 1 is a longitudinal cross-section view of an exemplary Stirling cycle thermal engine incorporating a novel hydrodynamic bearing in accordance with a first embodiment of this invention for supporting the engine driveshaft.

FIG. 1 illustrates a representative thermal engine 10 shown as a Stirling cycle engine which embodies the principles of the present invention. Engine 10 comprises a housing 12 which contains an operating mechanism 14 for converting the reciprocating motion of pistons 16 (one shown) into rotation of driveshaft 18. Operating mechanism 14 includes swashplate 20 rotatable with driveshaft 18 which is journaled to housing 12 for rotation about axis 22.

Energy is imparted to swashplate 20 by pistons 16 through connecting rods 24 which act on the swashplate at locations spaced radially outward from axis 22. For the engine 10 shown, four piston 16 and connecting rod 24 pairs are provided which are equally radially spaced about the perimeter of swashplate 20. Sliders 26 cause the connecting rods 24 to follow the motion of the plane of swashplate 20 as it is rotated. Since the plane of swashplate 20 is tipped from normal to axis 22, the reciprocating motion of the pistons 16 is converted into rotation of the swashplate.

Gears 28 and 30 are part of a mechanism which effects relative rotation between swashplate 20 and driveshaft 18, so as to change the angle of the swashplate (i.e., degree of tipping from normal to axis 22) thereby changing the stroke of pistons 16 and hence the engine power output.

For thermal engine 10 shown in FIG. 1, mechanical output power is used to drive an electric generator 34 contained within housing shell 36, and includes rotor 38 and stator 40. Rotor 38 is supported by axially displaced bearings 42 and 44. Rotation of driveshaft 18 is coupled to rotor 38 through splined connection 46.

The forces acting upon swashplate 20 can be resolved into two force components. One of these components causes rotation of swashplate 20 about axis 22. The other components result in the creation of a bending moment on driveshaft 18 which causes bending deflection. Such bending is shown in an exaggerated manner by dotted line 50 shown in FIG. 1.

FIG. 2 illustrates in a simplified manner the bending moments acting on driveshaft 18 through forces acting on swashplate 20. In that figure, driveshaft 18 is shown being supported by displaced shaft bearings generally designated by reference numbers 52 and 54. In a representative loading condition in which a connecting rod 24 force is applied to swashplate 20 as represented by arrow 58, bending moments are applied onto driveshaft 18 as shown by curve 56, shown in the lower portion of FIG. 2 which relates the longitudinal positioning along the driveshaft with the bending load exerted thereon. These bending loads are reduced to zero at the supporting points provided by bearings 52 and 54. The bending loads illustrated by FIG. 2 rotate with the driveshaft 18 such that the deflection illustrated by line 50 in FIGS. 1 and 2 also rotates to produce a high speed "wobble" of the shaft. Significantly, it should be noted that swashplate 20 is located nearer bearing 54, and the magnitude of the bending moment between the swashplate and bearing 52 is greater than that of between the swashplate and bearing 54. Consequently, the degree of axial disalignment caused by driveshaft bending at bearing 54 is less than that experienced at bearing 52.

Various types of bearings can be employed for supporting driveshaft 18. Although rolling element type bearings have been used successfully in this application, their lifespan is limited and accordingly their use can compromise the maintenance and overhaul intervals of engine 10. As a means of enhancing the operational lifespan of the the bearings, simple plane bearings are desirable. However, such bearings of conventional design are incapable of accommodating the small but significant axial misalignment caused by the bending loads acting on driveshaft 18.

In accordance with this invention, novel bearing arrangements for driveshaft 18 are provided which have the operational lifespan of ordinary plane bearings, yet accommodate driveshaft wobble. A bearing 60 in accordance with a first embodiment of the present invention is shown in FIG. 3 and is used at the position of bearing 52 shown in FIG. 2. In bearing 60, driveshaft 18 passes through bearing ring 62 which is integral with the shaft or formed by a separate component rigidly coupled to the shaft. The radially outer convex surface 64 of ring 62 is spherical having its center coincident with axis 22 of the driveshaft. Bearing shells 66 and 68 radially surround ring 62 and form a complimentary concave spherical surface 70. Bearing shells 66 and 68 are made of separate components to accommodate assembly. Spherical ring surface 64 is preferably microfinished to a highly smooth condition and bearing shell surfaces 70 are preferably formed of a bearing babbitt material bonded to a more rigid underlying layer.

In operation, the spherical surfaces 64 and 70 interact to provide a bearing interface with a lubrication film separating these surfaces in accordance with well-known hydrodynamic bearing principles. Numerous approaches toward lubrication of bearing 60 can be employed. For example, a splash-type lubrication system could be provided or the bearing could be immersed in an oil pool. As shown in FIG. 3, a pressure lubrication system is employed in which lubricant pumped through longitudinal oil supply passageway 72 is directed through radial passageway 74. In accordance with well-known plane bearing lubrication principles, the positioning of oil exit port 76 is at a low pressure area of the squeeze film formed between spherical surfaces 64 and 70.

The configuration of bearing 60 provides some shaft "steering" capability in that it axially locates driveshaft 18 in addition to restraining radial loads. As mentioned above, the axial length of the driveshaft section between swashplate 20 and bearing 54 is relatively short. Accordingly, the bending loads exerted on driveshaft 18 does not develop significant angular deflection of the driveshaft as it passes through the bearing 54 shown in FIG. 2. Accordingly, at this position, a simple cylindrical plane bearing 78 can be used. Such a bearing is illustrated in FIG. 1 and includes a conventional cylindrical journal 80 with a pair of cylindrical bearing shells 82 and 84. Like bearing 60, bearing 78 includes a drilled oil exit port 86 which introduces lubricant in a low pressure area of the squeezed film of the bearing surface interface. Bearing 78 is not required to restrain axial loads since the axial steering is accomplished through spherical bearing 60 as explained previously.

A spherical hydrodynamic bearing 90 in accordance with a second embodiment of this invention is illustrated in FIG. 4. For this embodiment, driveshaft 18 passes through bearing ring 92 which has a pair of bearing surfaces. An inside cylindrical bearing surface 94 interacts with a cylindrical journal surface 95 of driveshaft 18 in a conventional manner to provide a simple cylindrical plane bearing. The inside ring surface 94 is preferable coated with a soft metal in accordance with conventional plane bearing design principles. As shown by FIG. 4, oil supply passages 96 and 98 are provided for pressure lubrication. The exterior surface of ring 92 forms convex spherical surface 102 having its center coincident with driveshaft axis 22. Ring 92 is supported by bearing shells 104 and 106 in a manner that prevents relative rotation between the shell halves and the ring. For example, an antirotation projection and groove could be provided (not shown). Bearing shells 104 and 106 are preferable coated with a soft babbitt layer as described previously. The interface between ring 9 and bearing shells 104 and 106 could be lubricated through a splash system in which the wobbling motion of ring 92 would serve to distribute and spread an oil film at the spherical bearing interface. Alternately, an additional drilled pressure lubrication passage could be used to transfer lubricant from passage 98 to the spherical bearing interface.

Although bearing 90 provides accommodation of driveshaft wobble, it does not provide the steering effect of maintaining the axial positioning of driveshaft 18. Since some mechanism for axial location is necessary, bearing 112 is used which is shown in FIG. 5 and is positioned at bearing location 54. Bearing 112 is a cylindrical plane bearing having radially projecting interface surfaces 114 and 116 which provide the axial location steering effect. In order to facilitate assembly, either bearing 118 or bearing flanges 120 and 122 would be made of multi-piece assemblies. As previously mentioned, a bearing having cylindrical surfaces such as bearing 112 can be used at bearing location 54 since driveshaft wobble encountered at that location is negligible.

While the above description constitutes the preferred embodiments of the present invention, it will be appreciated that the invention is susceptible to modification, variation and change without departing from the proper scope and fair meaning of the accompanying claims.

We claim:

1. A spherical hydrodynamic bearing for supporting a driveshaft by the housing of a thermal engine of the type wherein a plurality of reciprocating pistons act on a swashplate forming a plane tipped from normal to the axis of rotation of the driveshaft, and wherein the pistons exert a rotating bending load on the driveshaft causing a rotating bending deflection of the driveshaft, the bearing comprising:

journal means carried by the driveshaft for forming a convex spherical surface having its center coincident with the axis of rotation of the driveshaft, bearing means carried by said housing for forming a concave spherical surface closely conforming to said journal means convex spherical surface, whereby relative motion between said spherical surfaces occurs in response to the rotating bending deflection of the driveshaft, and passageways formed in said driveshaft for supplying lubricant to said hydrodynamic bearing.

2. A hydrodynamic bearing according to claim 1 wherein said journal means comprises a ring member rigidly affixed to the driveshaft whereby said convex spherical surface rotates about said axis of rotation of the driveshaft upon rotation of the driveshaft.

3. A hydrodynamic bearing according to claim 1 wherein said journal means further forms a cylindrical inside surface which closely receives a cylindrical journal surface of the driveshaft and accommodates relative rotation about said axis of rotation of the driveshaft between the driveshaft and said journal means.

4. A hydrodynamic bearing according to claim 1 wherein said bearing means comprises at least two shell portions assembled around said journal means.

5. A spherical hydrodynamic bearing for supporting a driveshaft by the housing of a thermal engine of the type wherein a plurality of reciprocating pistons act on a swashplate forming a plane tipped from normal to the axis of rotation of the driveshaft, and wherein the pistons exert a rotating bending load on the driveshaft causing a rotating bending deflection of the driveshaft, the bearing comprising:

journal means rigidly coupled to the driveshaft for forming a convex spherical surface having its center coincident with the axis of rotation of the driveshaft, and bearing means carried by said housing for forming a concave spherical surface closely conforming to said convex spherical surface whereby said convex spherical surface rotates about the axis of rotation of the driveshaft in response to rotation of the driveshaft and said spherical surfaces further accommodating said rotating bending deflection of the driveshaft.

6. A spherical hydrodynamic bearing according to claim 5 further comprising a lubricant supply port formed in said journal means for supplying lubricant to the interface between said spherical surfaces.

7. A spherical hydrodynamic bearing according to claim 5 wherein the driveshaft is supported by first and second axially displaced bearings with the swashplate positioned therebetween and wherein said rotating bending load generates a relatively larger first bending deflection at said first bearing and a second relatively smaller bending deflection at said second bearing and said spherical bearing comprising said first bearing and a plane cylindrical bearing comprising said second bearing.

8. A hydrodynamic bearing according to claim 5 wherein said bearing means comprises at least two shell portions assembled around said journal means.

9. A spherical hydrodynamic bearing for supporting a driveshaft by the housing of a thermal engine of the type wherein a plurality of reciprocating pistons act on a swashplate forming a plane tipped from normal to the axis of rotation of the driveshaft, and wherein the pistons exert a rotating bending load on the driveshaft causing a rotating bending deflection of the driveshaft, the bearing comprising:

ring means having an inside cylindrical surface closely conforming to a cylindrical journal surface of the driveshaft thereby permitting relative rotation of the driveshaft and said ring means about the axis of rotation of the driveshaft, said ring means further forming a convex cylindrical surface having its center coincident with the axis of rotation of the driveshaft, bearing means carried by said housing for forming a concave spherical surface closely conforming to said ring means convex spherical surface, whereby relative motion between said spherical surfaces occurs in response to the rotating bending deflection of the driveshaft, and passageways formed in said driveshaft for supplying lubricant to said hydrodynamic bearing.

10. A spherical hydrodynamic bearing according to claim 9 wherein the driveshaft is supported by first and second axially displaced bearings with the swashplate positioned therebetween and wherein said rotating bending load generates a relatively larger first bending deflection at said first bearing and second relatively smaller bending deflection at said second bearing and said spherical bearing comprising said first bearing and a plane bearing having cylindrical bearing surfaces comprising said second bearing.

11. A spherical hydrodynamic bearing according to claim 10 wherein said second bearing further comprises radially extending bearing surfaces for axially locating said driveshaft.

12. A hydrodynamic bearing according to claim 10 wherein said bearing means comprises at least two shell portions assembled around said journal means.

* * * * *